United States Patent
Fatemi et al.

(10) Patent No.: US 10,804,757 B1
(45) Date of Patent: Oct. 13, 2020

(54) CYCLOIDAL RELUCTANCE MOTOR WITH ROTOR ELECTROMAGNETS

(71) Applicant: GM Global Technology Operations LLC, Detroit, MI (US)

(72) Inventors: Alireza Fatemi, Canton, MI (US); Derek F. Lahr, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 11 days.

(21) Appl. No.: 16/371,702

(22) Filed: Apr. 1, 2019

(51) Int. Cl.
| | |
|---|---|
| *H02K 21/16* | (2006.01) |
| *H02K 11/00* | (2016.01) |
| *H02K 1/24* | (2006.01) |
| *H02K 3/28* | (2006.01) |
| *H02P 27/06* | (2006.01) |
| *H02K 3/52* | (2006.01) |
| *H02K 19/12* | (2006.01) |

(52) U.S. Cl.
CPC .............. *H02K 1/24* (2013.01); *H02K 3/28* (2013.01); *H02K 3/52* (2013.01); *H02K 19/12* (2013.01); *H02P 27/06* (2013.01); *H02K 2201/18* (2013.01)

(58) Field of Classification Search
CPC ...... H02K 21/029; H02K 21/16; H02K 7/006; H02K 11/0094; H02K 11/33; H02K 2201/18; H02K 1/246; H02K 1/24; H02K 3/28; H02K 3/52; H02K 19/12; B60Y 2200/91; B60Y 2400/60; B60L 50/60; H02P 27/06

USPC ................................ 310/216.075, 216.107
See application file for complete search history.

(56) References Cited

U.S. PATENT DOCUMENTS

| | | | |
|---|---|---|---|
| 4,914,330 | A | 4/1990 | Pierrat |
| 5,448,117 | A | 9/1995 | Elliott |
| 9,669,701 | B2 | 6/2017 | Bolt |
| 9,890,832 | B2 | 2/2018 | Kurth et al. |
| 10,023,406 | B2 | 7/2018 | Klubertanz et al. |
| 10,090,747 | B2 | 10/2018 | Hofmeister |
| 2008/0289440 | A1* | 11/2008 | Denk ............... F16C 31/00 74/89.34 |
| 2010/0123426 | A1* | 5/2010 | Nashiki ............ H02K 1/12 318/701 |

* cited by examiner

*Primary Examiner* — Thomas Truong
(74) *Attorney, Agent, or Firm* — Quinn IP Law (57) ABSTRACT

A cycloidal reluctance machine includes a stator surrounding a rotor. Stator windings and rotor windings form respective concentric rotor and stator electromagnets. The rotor is eccentrically positioned with respect to the stator to move with two degrees of freedom (2DOF), including rotating motion about a rotary axis of the rotor and orbiting motion about a center axis of the stator. A rotor constraint mechanism (RCM) constrains motion of the rotor, such that the rotor is able to generate and transmit output torque to a coupled load in at least one of the 2DOF. A magnetic field polarity of stator poles and/or rotor poles of the respective stator and rotor changes over one electrical cycle of the polyphase voltage. The coupled load may be a drive axle of a vehicle in some embodiments. In others, the stator and rotor windings are driven via different power inverters.

18 Claims, 6 Drawing Sheets

CYCLOIDAL RELUCTANCE MOTOR WITH ROTOR ELECTROMAGNETS

INTRODUCTION

Rotary electric machines, when configured as motors or electric generators, typically include a rotating member ("rotor") and a stationary member ("stator"). The rotor may be disposed radially within or radially outside of the stator, such that the stator respectively surrounds or is surrounded by the rotor. In a permanent magnet machine, a set of rare earth magnets is arranged on and/or embedded within laminations of the rotor to provide a rotor magnetic field. Equally-spaced radial slots around a perimeter of a stator core are wound with lengths of conductive wire or bar conductor segments. In an alternating current (AC) machine configuration, a polyphase input voltage is applied to phase leads of the stator windings to generate a rotating magnetic field with respect to the stator core.

A resulting push-pull effect between the rotor and stator fields ultimately imparts a rotational force to the rotor. Torque imparted by such rotation may be harnessed, for instance using gear sets and/or pulleys, and thereafter used to produce useful work in a system. For example, motor torque may be delivered to a coupled load via a drive axle. Alternatively, when the electric machine operates as an electric generator, an internal combustion engine, turbine, or other prime mover may power the rotor and thereby produce a resulting electric current in the stator windings. The generated electric current is thereafter passed through a power inverter and used to charge constituent battery cells of a direct current (DC) battery pack.

Reluctance machines, which are a particular type of electric machine characterized by an absence of the above-noted permanent magnets, are of beneficial use in relatively high-power/high-torque applications. In a synchronous reluctance motor, for instance, magnetic poles are induced in a ferrous rotor when the stator windings are sequentially energized by an applied AC voltage. Rotor construction and the proximate placement of the rotor relative to the stator poles causes the rotor to align and synchronize with the rotating stator field. Evenly-spaced rotor projections in some machine configurations act as salient poles. Magnetic flux will tend to follow the path of least reluctance, and thus the nearest rotor pole will tend to move toward a position of alignment with the stator field. However, since the stator field continues to rotate, the movement of the rotor is continuous, with the stator pole leading the rotor pole to produce machine rotation.

SUMMARY

The present disclosure relates generally to radial flux-type rotary electric machines, and in particular to a cycloidal reluctance machine having a stator and an eccentrically-positioned rotor. A reluctance machine typically lacks a controllable rotor field, as noted above. Such a characteristic may be problematic in an eccentric reluctance machine, i.e., a cycloidal machine in which the rotor is eccentrically positioned radially within the stator. To counter this potential performance problem in the presently disclosed cycloidal reluctance machine, an independent and fully-controllable polyphase rotor field is introduced through the use of a set of rotor electromagnets. Collectively, the rotor electromagnets augment the electric machine's reluctance torque to effectively boost output torque.

With respect to machine eccentricity, the rotor contemplated herein is radially-separated from the surrounding stator by an airgap, with the size of the airgap varying in conjunction with the orbiting position of the rotor relative to the stator. The electric machine described herein is thus "cycloidal" in the sense that the rotor is constrained to move with two degrees of freedom (2DOF): (1) rotary motion about the rotor's axis of rotation, and (2) orbiting motion about the stator's axis. For a typical rotary electric machine, the electromagnetic torque that is present within the above-noted airgap may be derived according to the following equation [1], with t and r respectively denoting radial and tangential torque components in an example cylindrical coordinate system:

$$T_e = F_t R L_{ef}. \qquad [1]$$

In equation [1], $T_e$ is the electromagnetic torque in newton-meters, R is the average radius of the airgap in meters, $L_{ef}$ if the effective stack length of the active materials of the electric machine, also in meters, and $F_t$ is the tangential forces present within the airgap in newtons. The tangential forces, $F_t$, are defined as:

$$F_t = \frac{P}{2}\int_0^{2\pi} f_t(\phi_r) R d\phi_r \qquad [2]$$

where P is the number of poles of the electric machine, $f_t$ represents the tangential component of the airgap force density per unit length, and $\phi_r$ is the electrical angle covering each pole pair in radians.

According to the relationships expressed in the above-noted equations [1] and [2], the radial airgap forces, which are several times larger than the machine's tangential forces, do not contribute to the output torque of the electric machine. The disclosed embodiments of the cycloidal electric machine therefore incorporate otherwise unused radial airgap forces into the machine's output torque so as to realize certain performance advantages, including enabling output of higher levels of motor torque at lower motor speeds.

The present teachings with respect to the addition of a controllable rotor field are intended to optimize torque control in a cycloidal reluctance machine. The disclosed reluctance machine, by virtue of its purposefully situated electromagnets, experiences a rotating polyphase magnetic field in the rotor. The rotating magnetic field is used to boost output torque and enable use of a polyphase power inverter as disclosed herein. Also disclosed herein is an electrical system that includes a power inverter connected to a battery and configured to output a polyphase voltage. The electrical system further includes a cycloidal reluctance motor and a rotor constraint mechanism (RCM). The windings of the rotor and stator form respective concentric rotor and stator electromagnets. The rotor and stator electromagnets are electrically connected to the power inverter, e.g., separate inverters in a possible embodiment.

A respective magnetic field polarity of the stator and/or the rotor poles changes over one electrical cycle of the polyphase voltage.

The respective windings of the stator and rotor may be optionally embodied as concentrated non-overlapping windings. In such an embodiment, the magnetic field polarity of the stator poles changes over the one electrical cycle of the polyphase voltage, and the magnetic field polarity of the rotor poles does not change over the same electrical cycle.

Alternatively, the magnetic field polarity of the rotor poles may change over the one electrical cycle of the polyphase voltage while the magnetic field polarity of the stator does not change.

The reluctance machine in a possible configuration has four or more salient poles.

In other embodiments, the stator and rotor windings each may be distributed overlapping windings. In such an embodiment, the magnetic field polarity of the stator pole and that of the rotor pole may both change over the above-noted one electrical cycle of the polyphase voltage.

The reluctance machine may be alternatively embodied as a two-pole, three-phase electric machine. When such a configuration is used, a first power inverter may be connected to the stator windings and a second power inverter may be connected to the windings of the rotor, such that the stator and rotor are independently-controlled.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

The present disclosure is susceptible to modifications and alternative forms, with representative embodiments shown by way of example in the drawings and described in detail below. Inventive aspects of this disclosure are not limited to the disclosed embodiments. Rather, the present disclosure is intended to cover modifications, equivalents, combinations, and alternatives falling within the scope of the disclosure as defined by the appended claims.

DETAILED DESCRIPTION

Figure 1:
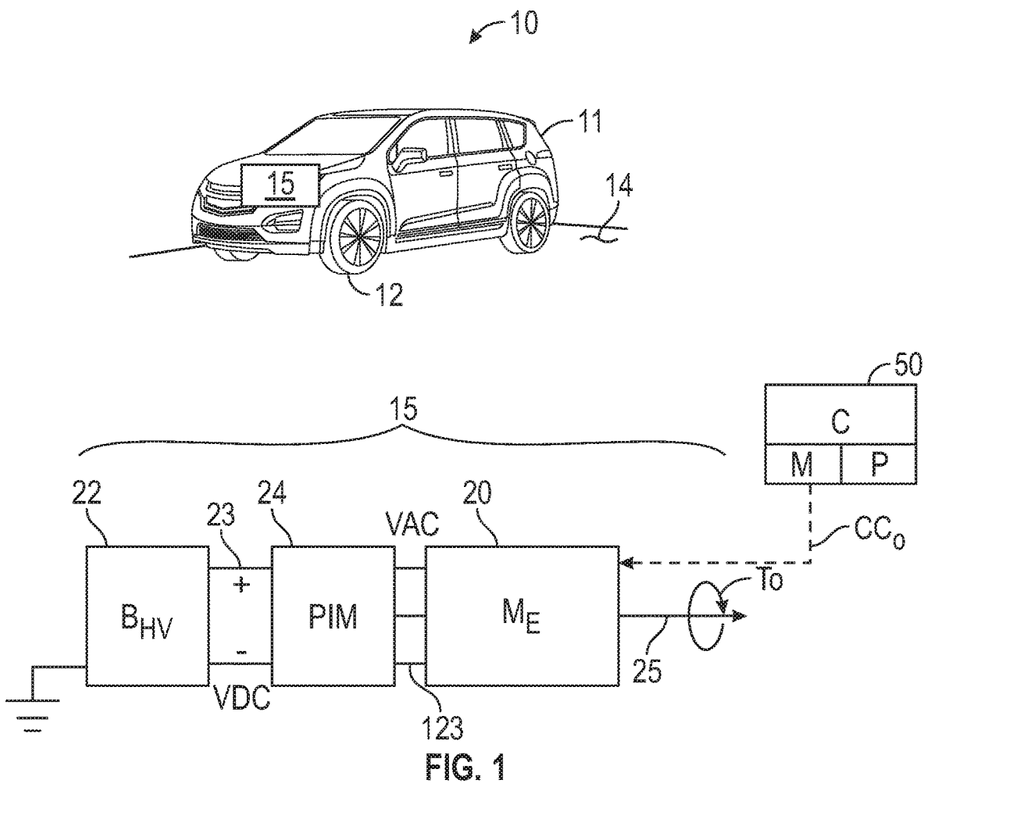
FIG. 1 is a schematic illustration of an example electrical system having a cycloidal electric motor as described herein.

Referring to the drawings, wherein like reference numbers refer to the same or like components in the several Figures, an electrical system 15 is shown schematically in FIG. 1. The electrical system 15 may be used as part of a vehicle 10 having a vehicle body 11, e.g., a motor vehicle having a set of road wheels 12 in rolling contact with a road surface 14. The electrical system 15 may also be used in other types of vehicles 10, for instance aircraft, watercraft, and rail vehicles, or in other mobile, non-vehicular applications such as robots and mobile platforms. Stationary applications may likewise benefit from use of the electrical system 15 as set forth below, and therefore the vehicle 10 of FIG. 1 is just one possible beneficial application of the present teachings.

Figure 2:
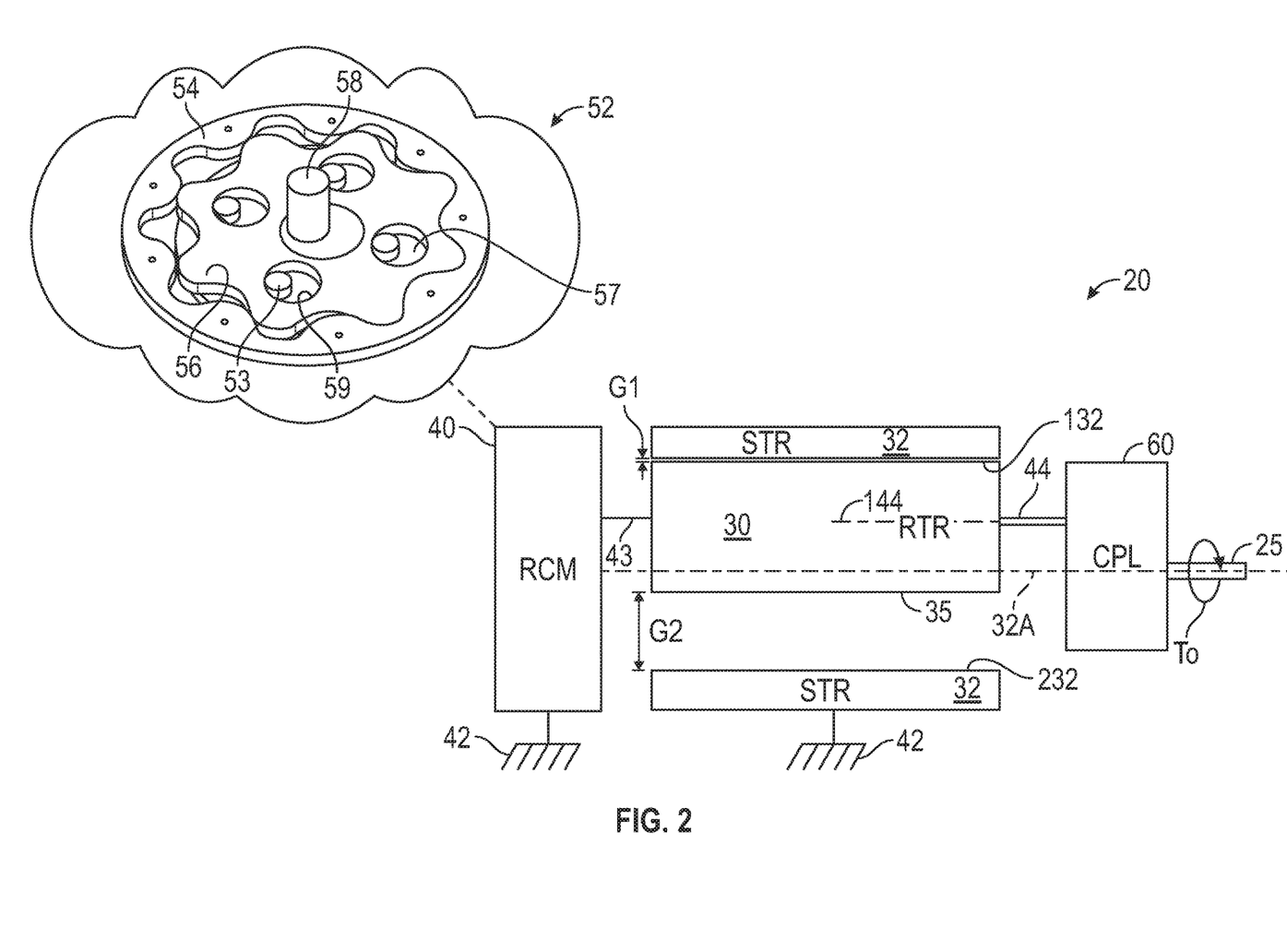
FIG. 2 is a schematic illustration of an electric machine, with integral or separate cycloidal gear set features shown via an inset, that is usable as part of the electrical system shown in FIG. 1.

The electrical system 15 includes a rotary cycloidal electric machine ($M_E$) 20 having an output member 25 coupled to a balanced rotor 30 (see FIG. 2). As used herein, the term "balanced" with respect to the rotor 30 and the electric machine 20 in general may be defined as a threshold low level of noise, vibration, and harshness (NVH) during sustained operation of the rotor 30, such that the rotor 30 does not perceptibly wobble or vibrate beyond the constrained two degrees of freedom (2DOF) detailed herein.

The electric machine 20 of the present disclose is a reluctance machine of the type generally described above. As will be understood by those of ordinary skill in the art, reluctance machines, e.g., synchronous, switched, or variable reluctance machines, are characterized by an absence of permanent magnets on the rotor 30, and instead operate via the creation of non-permanent magnetic poles on the rotor 30. As a result, motor output torque (arrow $T_O$) is generated via the principle of magnetic reluctance. The present rotor 30, however, is a purposefully-modified variation in which a controllable rotor field is provided in the manner set forth below, for the purpose of selectively augmenting reluctance torque of the electric machine 20.

Figure 3:
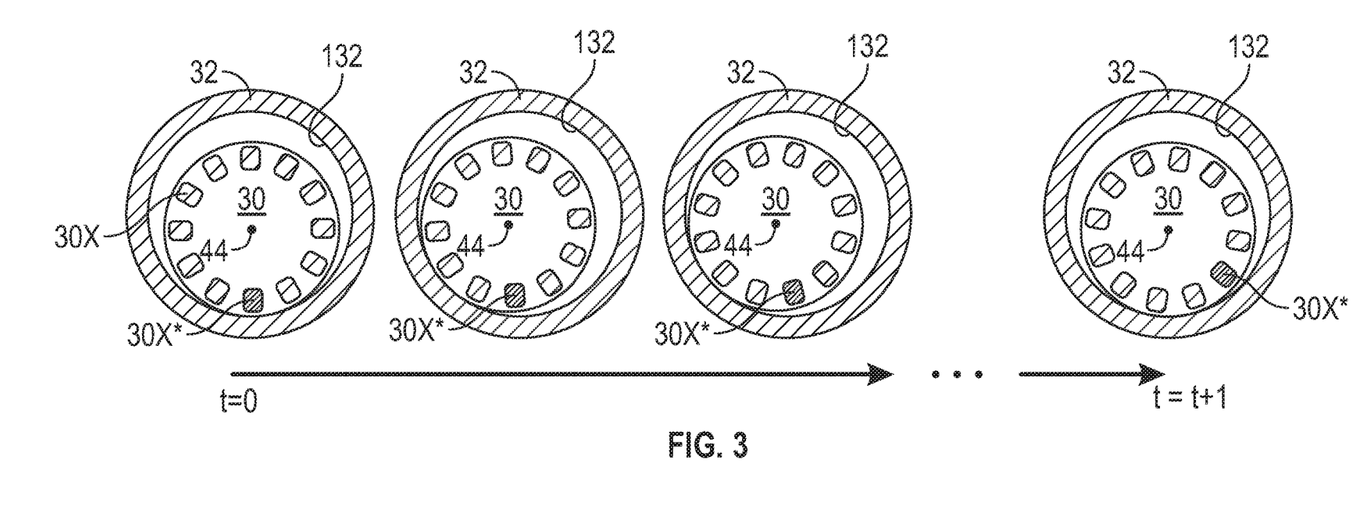
FIGS. 3 and 4 are schematic cross-sectional illustrations of respective rotating and orbiting motion of a rotor of the cycloidal electric machine of FIG. 2.
Figure 4:
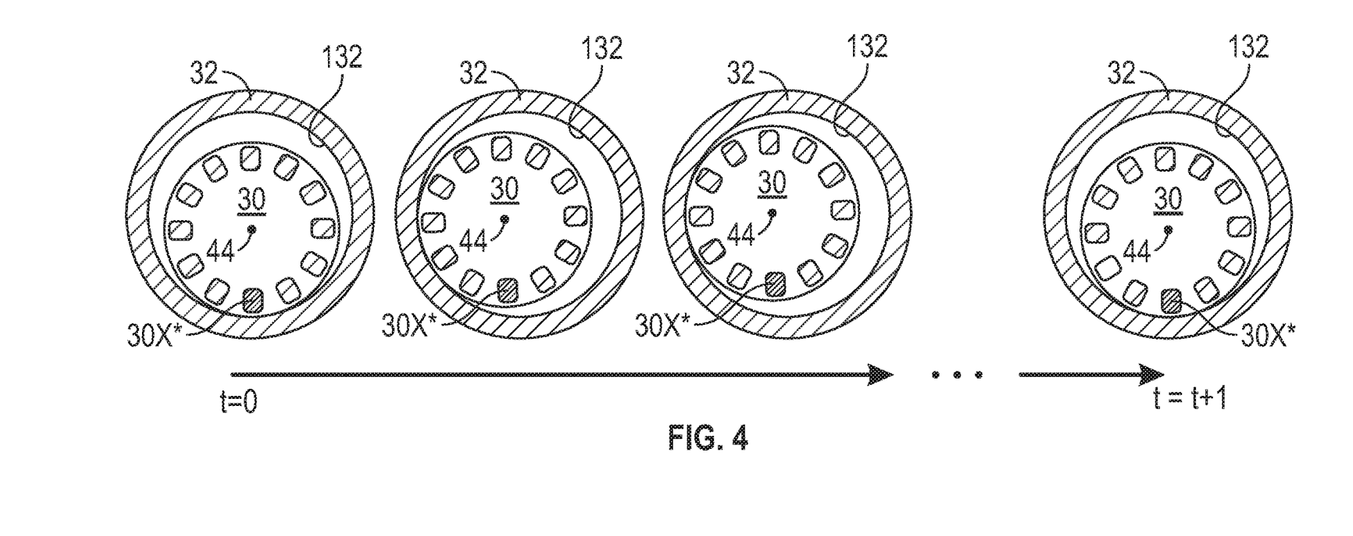

The cycloidal electric machine 20 of FIGS. 1-3 is operable for providing motion with 2DOF, i.e., rotary and orbiting motion, as respectively detailed in FIGS. 3 and 4. Certain enhancements to the cycloidal electric machine 20 may be included within the scope of the disclosure, with an example multi-rotor embodiment described below with particular reference to FIGS. 5-9. Collectively, the present teachings are intended to make beneficial use of otherwise largely unused radial airgap forces in the overall composition of the output torque (arrow $T_O$) of such a cycloidal electric machine 20, and to optimize generation and delivery of the output torque (arrow $T_O$) via the use of an independent, fully controllable rotor electromagnetic field as described below.

In the illustrated example embodiment of FIG. 1, the electrical system 15 includes a battery ($B_{HV}$) 22 and a power inverter module (PIM) 24. Options for the structure and control of the PIM 24 are described in further detail below with reference to FIG. 9. The battery 22 may have a relatively high voltage capacity, e.g., 60-volts or more depending on the embodiment, with "high-voltage" indicated by subscript "HV". The cycloidal electric machine 20 may be embodied as a polyphase electric motor and thus electrically connected to an AC bus 123, with the electric machine 20 energized by an AC voltage (VAC) from the PIM 24. The PIM 24 in turn is connected to the battery 22 via a DC voltage bus 23, with a DC voltage (VDC) supplied by the DC voltage bus 23 to the PIM 24 and vice versa depending on whether the cycloidal electric machine 20 functions as a motor or as a generator.

When energized, the cycloidal electric machine 20 generates and outputs the above-noted output torque (arrow $T_O$) to a driven load via the output member 25, for instance to a connected drive axle and/or the drive wheels 12 of the vehicle 10. Operation of the electrical system 15 may be regulated by a controller (C) 50 via control signals (arrow $CC_O$). The controller 50 may include a processor (P) and tangible, non-transitory memory (M), including read only memory in the form of optical, magnetic, or flash memory. The controller 50 may also include sufficient amounts of random-access memory and electrically-erasable programmable read only memory, as well as a high-speed clock, analog-to-digital and digital-to-analog circuitry, and input/output circuitry and devices, as well as appropriate signal conditioning and buffer circuitry.

Referring to FIG. 2, the rotor (RTR) 30 of the cycloidal electric machine 20 is eccentrically-positioned. Rotor 30 is radially disposed with respect to the stator (STR) 32, which may be grounded to a stationary member 42 as shown. The electric machine 20 may include a housing (not shown) in which the rotor 30, the stator 32, and other components are disposed and structurally supported. The stator 32 may be separated from the rotor 30 by an airgap (G1, G2), or the stator 32 may be in continuous contact with the rotor 30 at the instantaneous center of motion without sliding against an outer surface 35 of the rotor 30. The eccentric positioning of the rotor 30 provides the rotor 30 with the above-noted 2DOF, i.e., rotating motion and orbiting motion.

The rotor 30 is eccentrically-positioned and disposed radially within the stator 32, i.e., surrounded or circumscribed by the stator 32 in the schematically-illustrated example cylindrical embodiment of FIG. 2. The rotor 30 moves with rotating motion about a rotor axis 144, and orbiting motion around a center axis 32A of the stator 32, with the center axis 32A also referred to herein as the stator axis 32A. The rotor 30 and stator 32 may be mutually-separated from each other in some configurations by an airgap (G1 or G2). That is, depending on the orbiting position of the rotor 30 within the stator 32, the rotor 30 may be closer to a topmost inner circumferential surface 132, shown in FIG. 2 as the corresponding airgap G1, at which position the rotor 30 is farther away from a bottommost part, i.e., 232, of the inner circumferential surface 132 of the stator 32, with the larger corresponding airgap G2. As the rotor 30 orbits within the stator 32, the relative size of airgaps G1 and G2 will change, i.e., the airgap G2 becomes smaller than the airgap G1 whenever the rotor 30 orbits 180-degrees away from the position depicted in FIG. 2. The airgap G1, G2 may be zero in other embodiments, e.g., when a multi-lobed cycloidal disc 56 is integrated into the structure of the rotor 30 as described below.

The electric machine 20 is connected to or includes a rotor constraint mechanism (RCM) 40. The RCM 40 is configured to constrain motion of the rotor 30 such that the rotor 30 is able to generate useful application-specific torque on a coupled load. In certain embodiments, portions of the RCM 40 may be integrally formed with the structure of the rotor 30, while in other embodiments the RCM 40 may be embodied as an external set of components, e.g., portions of a cycloidal gear set 52 powering an output shaft 58.

General operation of the electric machine 20 may be understood with reference to the cycloidal gear set 52 shown as an inset in the upper left corner of FIG. 2. The cycloidal gear set 52 has a grounded/stationary outer ring gear element 54, within which is disposed the cycloidal disc 56. The cycloidal disc 56 defines equally-spaced holes 59. Pins 53, e.g., cylindrical posts as shown, may axially-extend from a gear element 57. The particular 2DOF motion enabled by the cycloidal gear set 52 will be appreciated by one of ordinary skill in the art, e.g., as a speed reduction mechanism.

The electrical system 15 shown in FIG. 1 may bodily incorporate certain structural functional aspects of the example cycloidal gear set 52 into its constituent structure without bodily incorporating the cycloidal gear set 52 itself. For instance, the function of the stationary outer ring gear element 54 and the cycloidal disc 56 may be combined into the structure and function of the RCM 40, with an input member 43 of the rotor 30 bolted to structure of the RCM 40 corresponding to the cycloidal disc 56. Such structure enables the rotor 30 to be constrained so as to rotate about the rotor axis 144 and, at the same time, to orbit about the stator axis 32A.

The disclosed arrangement enables higher levels of output torque (arrow $T_O$) from the electric machine 20, particularly when the electric machine 20 is embodied as a non-permanent magnet machine, e.g., a switched reluctance motor with motion tailored to the generated magnetic fields, and with the controller 50 of FIG. 1 possibly controlling such fields. At least part of the RCM 40 may be integrally formed with the rotor 30 in certain embodiments. For instance, a profile of the rotor 30 may be constructed to approximate or match a profile of the illustrated cycloidal disc 56 of the example cycloidal gear set 52, with the stator 32 being similarly constructed to form the mating profile of the outer ring gear element 54.

The rotor 30 and/or the electric machine 20 may be optionally connected to a coupling mechanism (CPL) 60. The CPL 60 is configured to translate rotation of the rotor 30 from the rotor axis 144 to a driven load. The CPL 60 may be positioned downstream of the rotor 30, i.e., coupled to the output member 44 of the rotor 30 and configured to translate the 2DOF motion of the rotor 30 into 1DOF motion. As used herein, the term "1DOF motion" describes rotation of the output member 25 and a connected driven load without orbiting motion. So, when the driven load is the above-noted drive axle or drive wheels 12 of the representative vehicle 10 shown in FIG. 1, the 1DOF motion of the rotor 30 powers the drive axle.

Various embodiments may be envisioned for implementing the CPL 60, including but not limited to an Oldham coupling mechanism. As will be appreciated, Oldham couplings utilize a compact arrangement of discs, i.e., an input-coupled disc, an output-coupled disc, and a rotating middle disc joined to the input-and output-coupled discs by a mating tongue-and-groove connection. Alternatively, the post-and-hole configuration shown in the cycloidal gear set 52 of FIG. 2 may be used, or a gear train constructed of multiple spur gears may be employed to the same ends, with these being just a few possible ways to implement the CPL 60.

As disclosed above, use of the CPL 60 within the example electrical system 15 of FIG. 1 is optional. That is, certain applications may be readily envisioned that make beneficial use of orbiting motion of the output member 25. An example is that of a mixing operation in which simultaneous rotation and orbiting motion may be desirable, e.g., when powering beaters of the type used to mix cement or to blend a food product. Other possible applications may find such 2DOF motion to be beneficial, such as in the propulsion systems of unmanned rovers or other special purpose vehicles, or in grinders, mixers, and washing machines.

Referring briefly to FIGS. 3 and 4, the above-noted 2DOF motion is represented schematically via a sequence of motion commencing at time t=0 and continuing until a future point in time t=t+1. FIG. 3 shows an example of cycloidal motion, such that the rotor 30, shown with circumferentially-spaced reference points 30X for illustrative clarity, has rotary motion radially within the surrounding stator 32. Such motion is indicated by the changing position of a representative reference point 30X* between t=0 and t=t+1. FIG. 4 shows orbiting motion, such that the rotor 30 "slides" around the inner circumferential surface 132 of the stator 32. Pure rotary motion, pure orbiting motion, or combinations of rotary and orbiting motion may be used in different applications, as noted above.

While 2DOF motion is enabled by the cycloidal electric machine 20, such motion may be less than optimal in terms of noise, vibration, and harshness (NVH). That is, unbalanced mechanical and magnetic forces may be provided by the disclosed cycloidal electric machine 20, which might cause excessive loads to be transmitted through bearings of the rotor 30 as well as imparting excessive loads to the stator 32. To smooth operation of the electric machine 20 and lower undesirable NVH effects, various approaches may be taken to help balance the electric machine 20.

Figure 5:
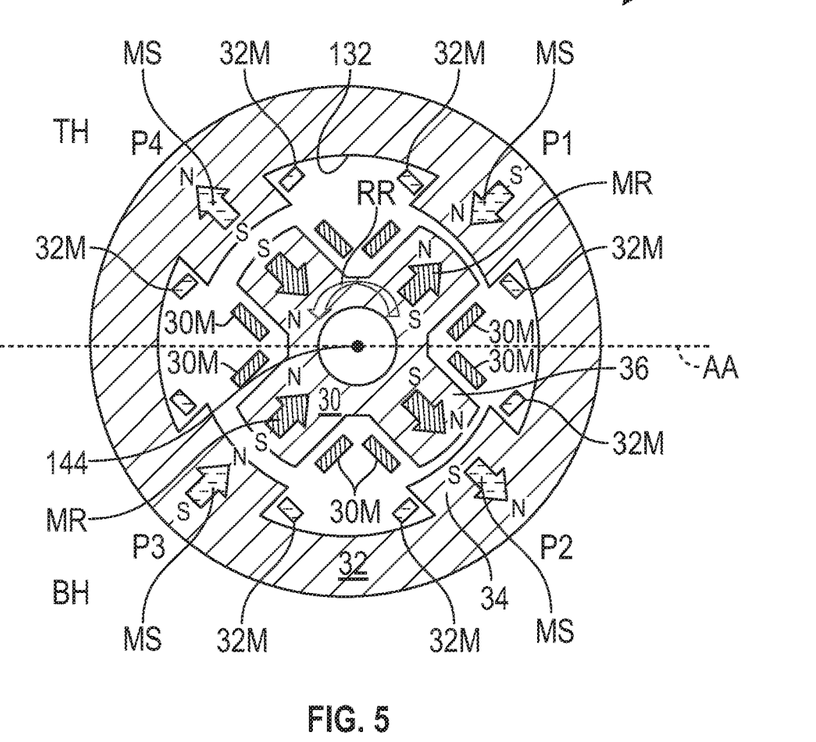
FIG. 5 is a schematic cross-sectional side view illustration of an embodiment of the cycloidal electric machine of FIG. 2 having concentrated non-overlapping windings.
Figure 6:
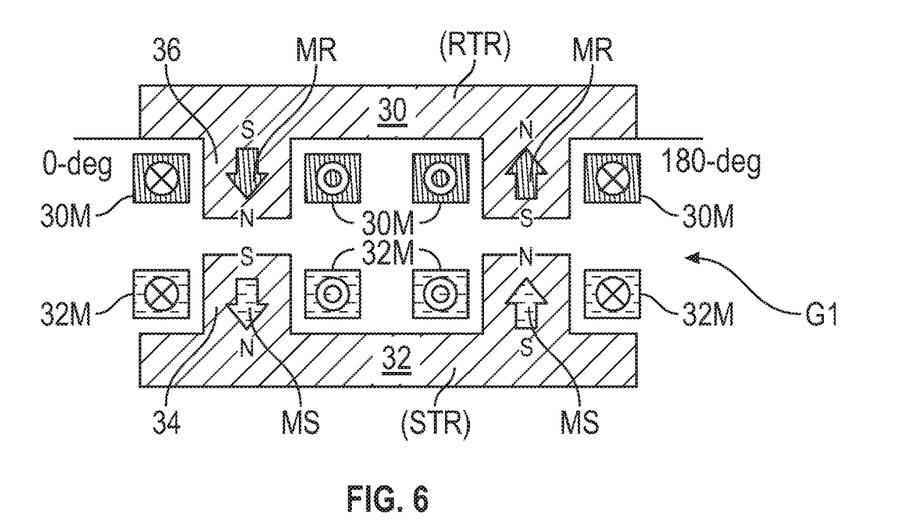
FIGS. 6 and 7 are schematic cross-sectional illustrations of rotor pole orientation for the cycloidal electric machine shown in FIG. 5.
Figure 7:
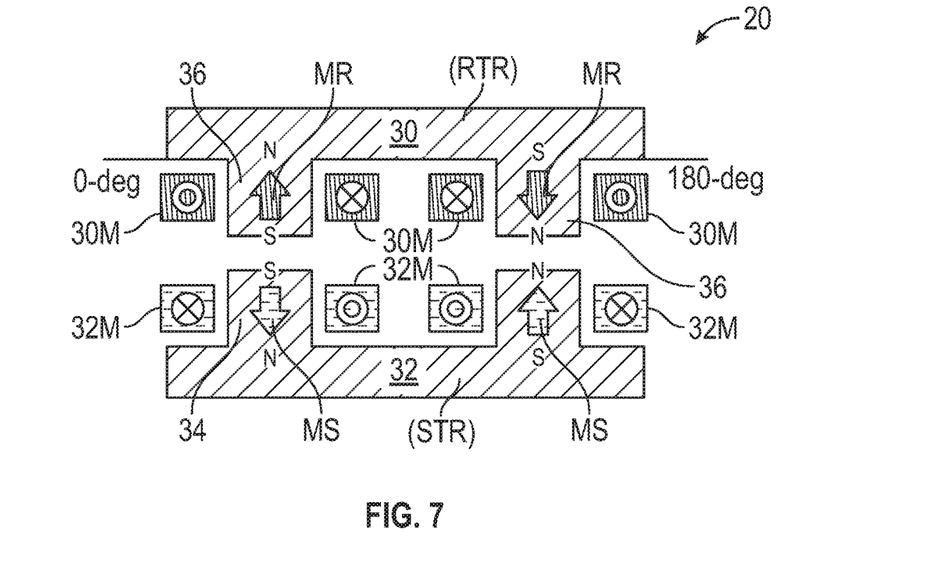

Referring to FIG. 5 in conjunction with FIGS. 6 and 7, an embodiment of the electric machine 20 is depicted in which the stator 32 circumscribes the rotor 30. The electric machine 20 is divided into two symmetrical halves labeled TH and BH in FIG. 5, with halves TH and BH representing symmetry half-planes as will be appreciated. The rotor 30 defines three or more rotor projections 36 as a corresponding number of salient poles, with four such rotor projections 36 and salient poles P1, P2, P3, P4 shown in FIG. 5, i.e., poles P1 and P4 located in half/symmetry half-plane TH and poles P2 and P3 located in half/symmetry half-plane BH at the illustrated instant of time.

The rotor 30 is in an orbiting position in which the air gap G1 located proximate salient poles P1 and P2 is smaller than the air gap G2 shown proximate salient poles P3 and P4. The illustrated embodiment entails the use of concentrated non-overlapping windings, as will be understood in the art. Stator electromagnets 32M are formed by winding conductors around radial projections of a stator core 34, as will be appreciated, with such projections protruding radially-inward from inner circumferential surface 132 as shown. Similarly, rotor electromagnets 30M are formed with respect to the rotor projections 36, e.g., as rotor coils. Arrows MS and MR represent the direction of magnetization of the stator 32 and rotor 30, respectively. Arrow RR is the direction of rotation of the rotor 30 about rotor axis 144.

In a typical electric machine, the two directions of magnetization indicated by respective arrows MS and MR would be orthogonal to each other, i.e., 90° C. apart, and thus the above-described tangential forces in the radial airgap between stator 32 and rotor 30 would be generated to the exclusion of potentially beneficial radial forces. When the directions of magnetization are fully-aligned, i.e., 0° C. apart, the opposite holds true, with the radial forces being generated to the exclusion of tangential forces. The provided eccentricity of rotor 30 enables beneficial use of such radial forces, with variation of the MMF alignment between 0° C. (fully radial) and 90° C. (fully tangential) incorporated into the configuration of the electric machine 20 to provide an application-specific performance advantage.

Excitation of halves TH and BH of the electric machine 20 at the same instant in time as is shown in FIG. 5 is depicted in FIGS. 6 and 7, respectively, with "X" and "O" representing the direction of electric current flow into and out of the page, respectively. As represented in FIG. 6, with the rotor 30 shown above the stator 32 according to convention, excitation of the rotor electromagnets 30M and stator electromagnets 32M as shown causes magnetic attraction of the rotor and stator poles. This state of magnetic attraction is indicated by the same direction of arrows MS and MR. FIG. 7 in contrast represents an energized state in which the stator and rotor poles repel each other, as indicated by the opposite directions of arrows MS and MR. Alternatively, one half-side of the stator 32 and rotor 30 could be excited based on the illustrated excitation of FIGS. 6 and 7.

The embodiment of FIGS. 5-7 may be realized by electrically connecting the rotor windings, i.e., the conductors forming the rotor electromagnets 30M, to the PIM 24 of FIG. 1. When the electric machine 20 is a brush-type machine, for instance, the connection may be through a commutator and brushes (not shown). Brushless exciter schemes may be used in the alternative. Excitation of the rotor electromagnets 30M could be performed in such as way as to result in a unidirectional flux path in the ferrous core of the rotor 30 or the stator 32. Use of such rotor electromagnets 30M would allow full control of the rotor magneto-motive force (MMF) for producing torque from the above-described radial forces and, if applicable, the tangential forces present in the airgap G1, G2 between the rotor 30 and stator 32 of FIG. 2. For generating torque using tangential forces, the reference point should be shifted from the inner diameter of the stator 32, i.e., inner circumferential surface 132 of FIG. 2, toward the center of the stator 32. Likewise, the angle between the MMF of the stator 32 and that of the rotor 30 could be used to optimize torque generation from both tangential and radial forces.

Figure 8:
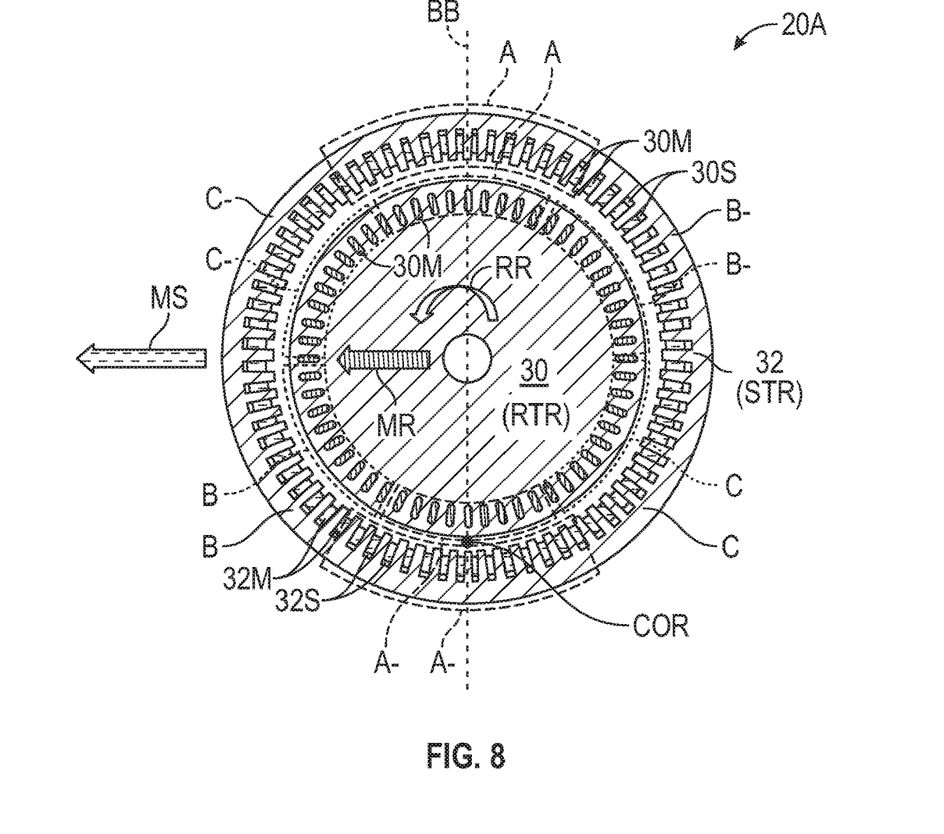
FIG. 8 is a schematic cross-sectional side view illustration of an embodiment of the cycloidal electric machine FIG. 2 having distributed overlapping windings.
Figure 9:
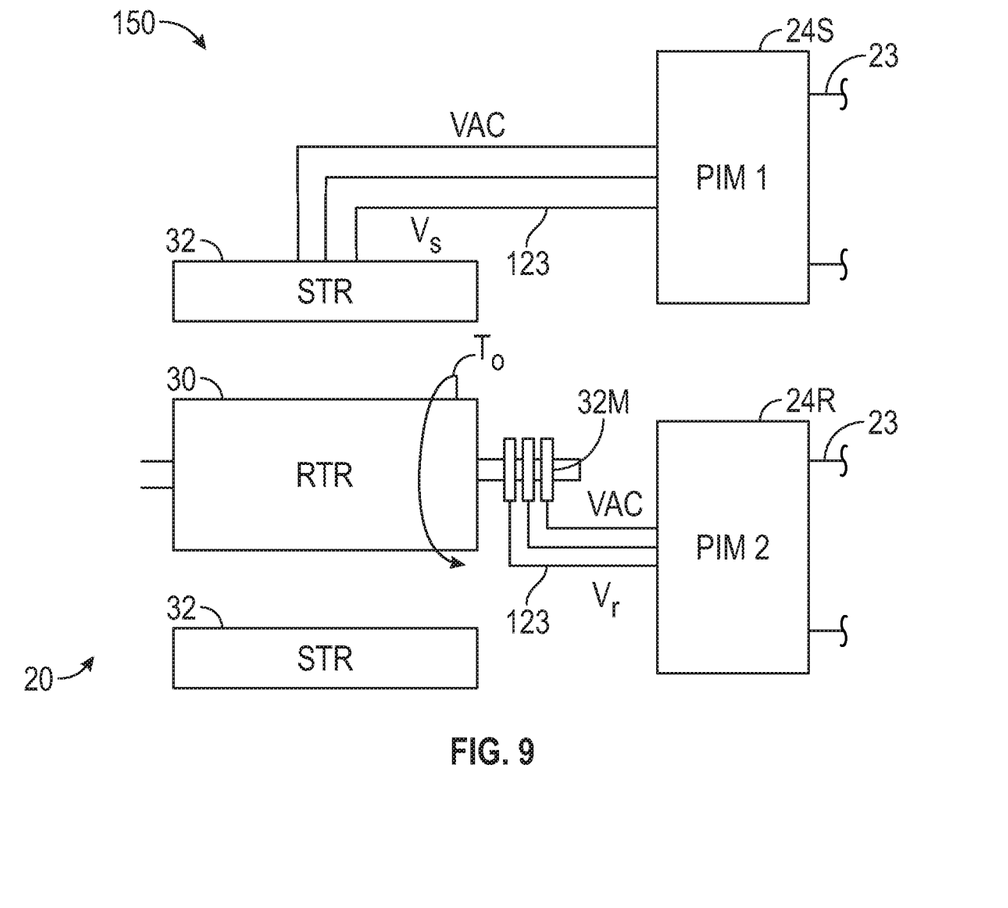
FIG. 9 is a schematic illustration of a possible dual-power inverter configuration for individually controlling the stator and rotor fields of the cycloidal electric machine depicted in FIG. 8.

Another embodiment of the electric machine 20 is shown in FIGS. 8 and 9. Unlike the embodiment of FIG. 5, the stator 32 and rotor 30 may be wound in a similar manner, e.g., using a three-phase, two-pole AC machine winding scheme. Such an approach may be used with distributed overlapping windings, as that term is understood in the art. The rotor electromagnets 30M could be connected to an outside power source, for instance through slip rings and brushes (not shown) of the electric machine 20.

An example three-phase implementation is shown in FIG. 8 as electric machine 20A, with the electrical phases of the stator 32 and rotor 30 labeled by convention as phases A, B, and C, with phases A, B, and C varying from each other by 120° C. That is, phase A is 120° C. ahead of phase B and 240° C. ahead of phase C, etc. Thus, as shown, the electric machine 20A is a 2-pole/3-phase variant of the electric machine 20, one in which pole saliency is minimized. As with FIG. 5, arrows MS and MR represent the direction of the MMF of the stator 32 and rotor 30, respectively, and arrow RR is the direction of rotation of rotor 30. A center of rotation (COR) of the electric machine 20A is also depicted, i.e., a radius of a ring gear element 54 in the gear set 52 shown in FIG. 2. The number of slots in the rotor 30 and stator 32 may be as shown, i.e., with sixty slots 30S of the rotor 30 and seventy-two slots 32S of the stator 32. Other three-phase embodiments may be contemplated using fewer or more such slots, and therefore the illustrated embodiment is non-limiting and illustrative of the present teachings.

The respective stator and rotor electromagnets 32M and 30M may be individually excited via the corresponding PIM 24S and 24R as shown as part of an alternative electrical system 150 in FIG. 9, such that the resultant MMFs of the rotor 30 and stator 32 are in line with each other and perpendicular to the center of rotation (COR) at each instant. In lieu of the separate PIMs 24S and 24R of FIG. 9, one may use 9-switch inverters or other reduced component count power inverters. A higher number of phases of the stator 32 may be used in conjunction with a selective phase-deactivation method to improve upon output torque ($T_O$). These and other benefits will be readily appreciated by one of ordinary skill in the art in view of the forgoing disclosure.

FIGS. 5 and 8 therefore provide two possible implementations of the present electric machine 20. In the embodiment of FIG. 1, the field of each stator pole is augmented by the field of each rotor pole, with the stator field boosted in one symmetry half-plane (TH or BH of FIG. 8) and repelled in the other as described above. Such an approach entails pole-by-pole excitation.

In either embodiment, excitation of the rotor 30 and stator 32 may be performed in such a way as to produce a unidirectional flux path in the ferrous core of either the rotor 30 or stator 32, respectively. The use of the disclosed electromagnets 30M and 32M enables full control of the MMF of rotor 30 to produce torque from radial and, if applicable, from tangential forces in the airgap of the electric machine 20. That is, the angle between MMF of the stator 32 and rotor 30 may be used to optimize torque generation from both radial and tangential forces, as noted elsewhere above. These and other benefits will be appreciated by one of ordinary skill in the art in view of the disclosure.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. An electrical system comprising:
    a battery;
    a power inverter connected to the battery and outputting a polyphase voltage;
    a cycloidal reluctance machine having a rotor surrounded by a stator, wherein:
        windings of the rotor and stator form respective concentric rotor and stator electromagnets, wherein the rotor and stator electromagnets are electrically connected to the power inverter;
        the cycloidal reluctance machine is configured such that a magnetic field polarity of respective poles of the stator and/or the rotor changes over one electrical cycle of the polyphase voltage; and
        the rotor is eccentrically positioned with respect to the stator to move with two degrees of freedom (2DOF), the 2DOF including rotating motion about a rotary axis of the rotor and orbiting motion about a center axis of the stator; and
    a rotor constraint mechanism (RCM) configured to constrain motion of the rotor, such that the rotor is able to generate and transmit output torque to a coupled load in at least one of the 2DOF.

2. The electrical system of claim 1, wherein the windings of the stator and the windings of the rotor are concentrated non-overlapping windings.

3. The electrical system of claim 2, wherein the magnetic field polarity of the stator poles changes over the one electrical cycle of the polyphase voltage, and the magnetic field polarity of the rotor poles does not change over the one electrical cycle of the polyphase voltage.

4. The electrical system of claim 2, wherein the magnetic field polarity of the rotor poles changes over the one electrical cycle of the polyphase voltage, and the magnetic field polarity of the stator poles does not change over the one electrical cycle of the polyphase voltage.

5. The electrical system of claim 2, wherein the reluctance machine has three or more salient poles.

6. The electrical system of claim 1, wherein the windings of the stator and the windings of the rotor are distributed overlapping windings.

7. The electrical system of claim 6, wherein a respective magnetic field polarity of a stator pole of the stator and a rotor pole of the rotor changes over the one electrical cycle of the polyphase voltage.

8. The electrical system of claim 7, wherein the reluctance machine is a two-pole, three-phase electric machine.

9. The electrical system of claim 8, wherein the power inverter includes a first power inverter connected to the windings of the stator and a second power inverter connected to the windings of the rotor.

10. The electrical system of claim 1, wherein the coupled load is a drive axle of a vehicle.

11. A cycloidal reluctance machine connectable to a polyphase voltage, and comprising:
    a stator having stator windings;
    a rotor surrounded by the stator and having rotor windings, wherein the stator windings and the rotor windings form respective concentric stator and rotor electromagnets, and wherein the rotor is eccentrically positioned with respect to the stator to move with two degrees of freedom (2DOF), the 2DOF including rotating motion about a rotary axis of the rotor and orbiting motion about a center axis of the stator; and
    a rotor constraint mechanism (RCM) configured to constrain motion of the rotor, such that the rotor is able to generate and transmit output torque to a coupled load in at least one of the 2DOF;
    wherein the cycloidal reluctance machine is configured such that a magnetic field polarity of stator poles and/or rotor poles of the respective stator and rotor changes over one electrical cycle of the polyphase voltage.

12. The cycloidal reluctance machine of claim 11, wherein the stator windings and the rotor windings are concentrated non-overlapping windings.

13. The cycloidal reluctance machine of claim 12, wherein the magnetic field polarity of the stator poles changes over the one electrical cycle of the polyphase voltage, and the magnetic field polarity of the rotor poles does not change over the one electrical cycle of the polyphase voltage.

14. The cycloidal reluctance machine of claim 12, wherein the magnetic field polarity of the rotor poles changes over the one electrical cycle of the polyphase voltage, and the magnetic field polarity of the stator poles does not change over the one electrical cycle of the polyphase voltage.

15. The cycloidal reluctance machine of claim 11, wherein the reluctance machine has four or more salient poles.

16. The cycloidal reluctance machine of claim 11, wherein the stator windings and the rotor windings are distributed overlapping windings.

17. The cycloidal reluctance machine of claim 11, wherein a respective magnetic field polarity of a stator pole of the stator and a rotor pole of the rotor changes over the one electrical cycle of the polyphase voltage.

18. The cycloidal reluctance machine of claim 17, wherein the reluctance machine is a two-pole, three-phase electric machine.

* * * * *